United States Patent
Reuter et al.

(10) Patent No.: US 12,140,194 B2
(45) Date of Patent: Nov. 12, 2024

(54) DRIVE TRAIN UNIT WITH A TORSION DAMPER AND AN INNER INTERMEDIATE HUB

(71) Applicant: Schaeffler Technologies AG & Co. KG, Herzogenaurach (DE)

(72) Inventors: Björn Reuter, Bühl (DE); Alexander Voit, Sinzheim (DE); Frank Wille, Bühl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 420 days.

(21) Appl. No.: 17/618,911

(22) PCT Filed: May 6, 2020

(86) PCT No.: PCT/DE2020/100379
§ 371 (c)(1),
(2) Date: Dec. 14, 2021

(87) PCT Pub. No.: WO2021/000983
PCT Pub. Date: Jan. 7, 2021

(65) Prior Publication Data
US 2022/0252133 A1    Aug. 11, 2022

(30) Foreign Application Priority Data

Jul. 3, 2019 (DE) .................. 10 2019 117 987.4
Sep. 24, 2019 (DE) .................. 10 2019 125 611.9

(51) Int. Cl.
*F16F 15/123* (2006.01)
*F16F 15/129* (2006.01)

(52) U.S. Cl.
CPC .... *F16F 15/1238* (2013.01); *F16F 15/12366* (2013.01); *F16F 15/1297* (2013.01)

(58) Field of Classification Search
CPC ............ F16F 15/1238; F16F 15/12366; F16F 15/1297
USPC ........................................ 464/46, 68.1, 68.6
See application file for complete search history.

(56) References Cited

U.S. PATENT DOCUMENTS 5,377,560 A * 1/1995 Schierling .......... F16F 15/13453
8,968,150 B2 * 3/2015 Misu .................... B60L 50/16
10,138,978 B2    11/2018 Sugiyama et al.
(Continued)

FOREIGN PATENT DOCUMENTS

| CN | 1601134 A | 3/2005 |
| CN | 101111693 A | 1/2008 |
| CN | 212338025 U | 1/2021 |

(Continued)

*Primary Examiner* — Greg Binda

(57) ABSTRACT

A drive train unit for a drive train of a motor vehicle includes an input component for introducing a torque, a torsion damper for damping rotational non-uniformities, an output component for outputting the torque, and an intermediate hub. The torsion damper is connected in a torque-transmitting manner to the input component. The torsion damper includes a main damper having a spring element, and a radial inner side. The output component is connected in a torque-transmitting manner to the torsion damper. The output component is arranged radially outside of the spring element. The intermediate hub connects the torsion damper to the output component on the radial inner side.

8 Claims, 5 Drawing Sheets

(56) References Cited

U.S. PATENT DOCUMENTS

2014/0221106 A1* 8/2014 Jimbo .................. F16F 15/145
2016/0047434 A1 2/2016 Sugiyama et al.

FOREIGN PATENT DOCUMENTS

| EP | 1460303 A1 | 9/2004 |
| EP | 2765330 A2 | 8/2014 |
| EP | 3006774 A1 | 4/2016 |
| JP | 2013190108 A | 9/2013 |
| WO | 2014147839 A1 | 9/2014 |

* cited by examiner

DRIVE TRAIN UNIT WITH A TORSION DAMPER AND AN INNER INTERMEDIATE HUB

CROSS-REFERENCE TO RELATED APPLICATIONS

This application is the United States National Phase of PCT Appln. No. PCT/DE2020/100379 filed May 6, 2020, which claims priority to German Application Nos. DE102019117987.4 filed Jul. 3, 2019 and DE102019125611.9 filed Sep. 24, 2019, the entire disclosures of which are incorporated by reference herein.

TECHNICAL FIELD

The present disclosure relates to a drive train unit for a drive train of a motor vehicle, in particular a hybrid drive train, in which both electrical and internal combustion engine driving states are possible. The drive train unit includes an input component for the introduction of a torque, a torsion damper which is connected in a torque-transmitting manner to the input component for damping rotational non-uniformities, and an output component which is connected in a torque-transmitting manner to the torsion damper for outputting the torque. The output component is arranged radially further to the outside than a spring element of a main damper of the torsion damper.

BACKGROUND

Torsional vibration dampers having a torque limiter are already known from the prior art. For example, EP 2 765 330 A2 discloses a power transmission device having a first rotational element rotatable about a first rotational axis, a second rotational element rotatable about a second rotational axis, a third rotational element arranged between the first and second rotational elements, a torsion damper arranged between the first and third rotational elements, a torque limiter arranged between the second and third rotational elements, and a dynamic vibration damper provided on the third rotational element.

In the publication stated above, the torque limiter is located in the power flow behind the torsion damper or in the power flow in front of the torsion damper. Regardless of the arrangement within the power flow, the torque limiter is arranged above the torsion damper, i.e., radially further to the outside than the torsion damper, and is connected to the torsion damper on the outside, i.e., on a radial outer side of the torsion damper. Thus, for example, a downstream torque limiter results in a power flow in which the torque is introduced into the torsion damper via an input shaft and a flywheel, is transmitted externally from the torsion damper into the torque limiter, and is discharged from the torque limiter into an output shaft.

However, in the prior art, connecting the torque limiter to the torsion damper presents a technical challenge due to the installation space requirements as well as the functionality, and, in particular, a connection on the outside of the torsion damper is not desirable.

SUMMARY

The present disclosure provides a torsion damper having a downstream torque limiter, i.e., one arranged downstream in the power flow, which is designed to be particularly compact, especially in the radial direction, as well as functional. Thus, a suitable power flow is to be enabled in which, above all, a transmission input shaft is protected, in particular by arranging the torque limiter close to this transmission input shaft.

A generic device according to the present disclosure includes the torsion damper connected to the output component via an intermediate hub which acts on a radial inner side of the torsion damper.

With such a device, torque can be transmitted particularly well due to the connection of the intermediate hub on the inside of the torsion damper. Prior art drive train units having a torsion damper and a torque limiter downstream of the torsion damper are known in which the torque is diverted radially outward from the torsion damper, but this is not always desirable or possible, especially in case of a hybrid drive train. In addition, the design according to the disclosure allows the drive train unit to be used for radially small installation spaces that do not permit an upper connection of the torque limiter. Torque dissipation via the radially inner intermediate hub allows the torque limiter to be set further inwards.

According to an example embodiment, the output component can be configured as a torque limiter. The provision of the torque limiter prevents downstream components in the torque flow from being overloaded due to high torque peaks. In other words, the torque limiter is connected downstream of the torsion damper. Optionally, a centrifugal pendulum can also be provided in the drive train unit.

In another example embodiment, the torque limiter can have a sliding plate, friction linings that rest axially on the sliding plate, e.g., on both sides, and a disc spring that applies a defined clamping force to the friction linings. The sliding plate can be connected directly or indirectly to the intermediate hub, for example via a rivet connection at a radially outer end of the intermediate hub. The sliding plate can be connected to the intermediate hub on the left side or right side.

In addition, the friction linings, the disc spring and the sliding plate may be arranged axially between two side plates that define a position of the components. A support plate can be provided in the axial direction between the disc spring and the friction linings, which enables uniform clamping force introduction into the friction linings. Spacer rivets may be provided between the side plates in the axial direction. As a result, the components of the torque limiter can be arranged at a desired axial distance. The support plate may have an external toothing which engages between the spacer rivets. As a result, the support plate is axially displaceable between the side plates, but at the same time radially and tangentially attached via the external toothing.

According to an example embodiment, one of the two side plates or both side plates can be stiffened. For example, one of the two side plates or both side plates may have a lateral axial cup at a radially outer end, especially radially outside the friction linings. The cup can be formed axially inwards or axially outwards. This provides additional stiffening of the side plates, which counteracts expansion due to the high axial forces applied by the disc spring within the torque limiter.

In an example embodiment, the intermediate hub may have a main body extending substantially in the axial direction and a disc section extending substantially radially outward from the main body. This allows the torque to be transmitted from the radial inner side of the torsion damper to the output component, which is axially adjacent and radially further outside.

According to an example embodiment, the main body and the disc section can be configured as a single part. This means that the intermediate hub is made from a complete part, i.e., formed integrally.

According to an example embodiment, the main body and the disc section may be configured as components separate from one another. This means that in the case of a multi-part, e.g., two-part, configuration, the intermediate hub is made from several, e.g., two, parts which are then joined together.

According to an alternative embodiment, the main body and the disc section can be connected to one another by means of a material connection, such as a welded connection, and/or by means of a force-fit and form-fit connection, such as a caulking connection, and/or by means of a form-fit connection, such as a rivet connection. This provides a particularly strong joint that is also suitable for transmitting high torque.

In an example embodiment, an outer contour of the intermediate hub, in particular an axial end face of the intermediate hub facing away from the torsion damper, for example, or the entire intermediate hub can be machined. Turning has, for example, proved advantageous for reasons of installation space, production technology and/or assembly technology in order to produce the outer contour efficiently.

The intermediate hub can be hardened, e.g., case-hardened. A surface hardness between 500 and 2000 HV has been found to be suitable. It one embodiment, the surface hardness of the intermediate hub is greater than 680 HV.

The main damper may have a driver disc and a hub flange rotationally coupled to the driver disc via the spring element. The main damper may also have a counter disc that is firmly connected to the driver disc, for example by means of a rivet connection.

According to an example embodiment, the torsion damper may have a pre-damper (in addition to the main damper). By providing an additional pre-damper, the damping characteristics of the torsion damper can be adjusted more precisely and, for example, designed differently in different torque ranges. However, the torsion damper may also have only the main damper.

The pre-damper may have a pre-damper cage divided into two, for example, and a pre-damper hub flange rotationally coupled to the pre-damper cage via a pre-damper spring element. The pre-damper can be arranged in parallel to the main damper or in series with the main damper.

According to an example embodiment, the hub flange and/or the pre-damper hub flange can be connected in a torque-transmitting manner to the intermediate hub via a profiled gearing. Regarding the design of the torsion damper having the pre-damper, an intermediate hub connection of the (main damper) hub flange via a profiled gearing with a clearance angle and an intermediate hub connection of the (pre-damper) hub flange via a profiled gearing without a clearance angle have proven to be beneficial, as this allows a torsion angle of the pre-damper to be defined by the clearance angle.

According to an example embodiment, the hub flange, in particular when the torsion damper is configured without the pre-damper, can be connected to the intermediate hub via profiled gearing without a clearance angle in a torque-transmitting manner. Alternatively, a torsionally rigid/rotationally fixed connection can also be provided between the hub flange and the intermediate hub, such as a material connection, for example a welded connection, or a force-fit and form-fit connection, such as a caulking connection.

In a further embodiment, the intermediate hub can be centered on an output hub connected in a torque-transmitting manner to the output component, for example via a centering sleeve. This ensures that the output component and the torsion damper are aligned to be coaxially centered to respect to one another. According to an example embodiment, the intermediate sleeve can be made of plastic.

In addition, the output component may be axially fixed relative to the torsion damper, for example by a securing ring. The securing ring can act on the output hub and a friction sleeve of the torsion damper.

BRIEF DESCRIPTION OF THE DRAWINGS

The present disclosure is explained below with the aid of drawings. In the figures.

DETAILED DESCRIPTION

The figures are only schematic in nature and serve only for understanding the present disclosure. The same elements are provided with the same reference symbols. The features of the individual embodiments can be interchanged.

Figure 1:
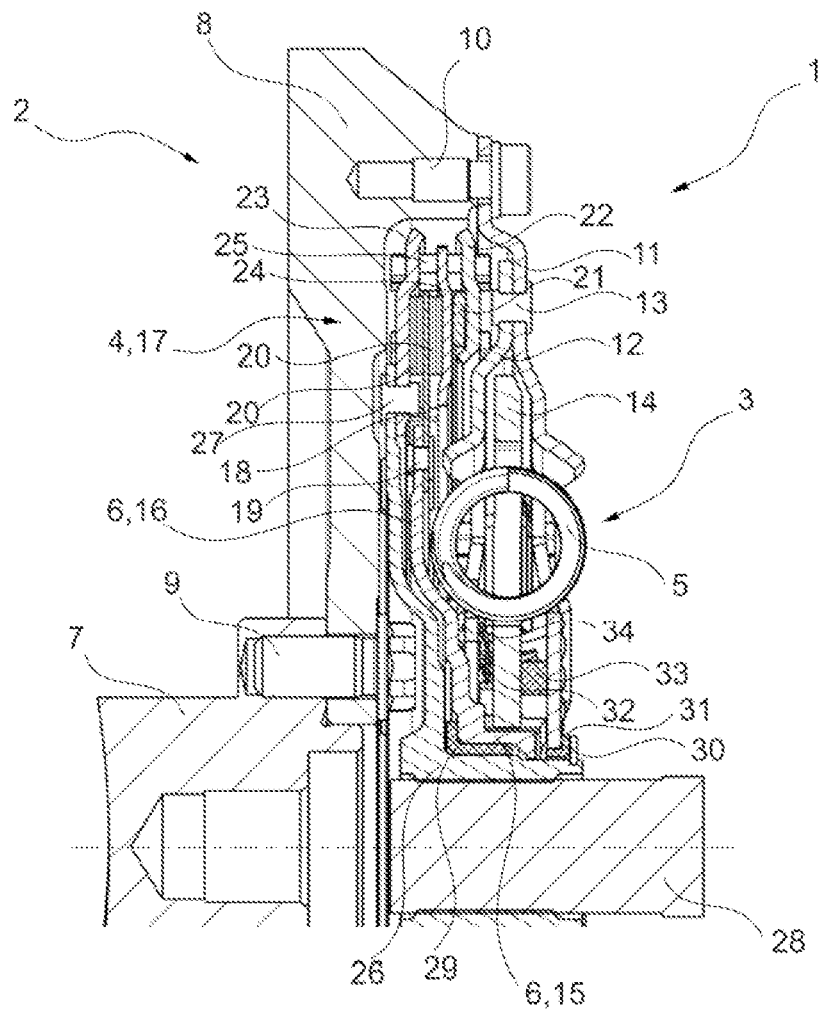
FIG. 1 shows a longitudinal sectional view of a drive train unit according to a first embodiment.

FIG. 1 shows a first embodiment of a drive train unit 1 for a motor vehicle. The drive train unit 1 includes an input component 2 for the introduction of a torque. The drive train unit 1 further includes a torsion damper 3 connected in a torque-transmitting manner to the input component for damping rotational non-uniformities. The drive train unit 1 includes an output component 4 connected in a torque-transmitting manner to the torsion damper 3 for outputting the torque. Here, the output component 4 is arranged radially further to the outside than a spring element 5 of the torsion damper 3.

The torque flow can also be in the reverse direction, in which case the output component 4 is used to introduce the torque and the input component 2 is used to output the torque. For the sake of simplicity, however, the torque flow is described below in one direction only.

According to the disclosure, the torsion damper 3 is connected to the output component 4 via an intermediate hub 6 which acts on a radial inner side of the torsion damper 3. Accordingly, the intermediate hub 6 is provided radially on the inside of the torsion damper 3 and is guided radially outward above the spring element 5. This means that the torque is transmitted or diverted radially on the inside at the torsion damper 3 and from there is introduced radially to the outside into the output component 4 via the intermediate hub 6.

The torque is introduced into the drive train unit 1 via a drive shaft 7. From there, the torque is transmitted to a flywheel 8. The drive shaft 7 is connected to the flywheel 8 via a screw connection 9. The torque is transmitted from the flywheel 8 to the torsion damper 3. The flywheel 8 is connected to the torsion damper 3 via a screw connection 10. The torque is introduced into the torsion damper 3 radially from the outside. Accordingly, the drive shaft 7 and flywheel 8 serve as the input component 2.

The torsion damper 3 has a driver disc 11. The driver disc 11 is connected to the flywheel 8 via the screw connection 10. The torque is introduced into the torsion damper 3 via the driver disc 11 in this manner. The torsion damper 3 has a counter disc 12. The counter disc 12 is firmly connected to the driver disc 11 by a rivet connection 13. The torsion damper 3 has the spring element 5. The spring element 5 is formed, for example, by a plurality of compression springs, such as spiral springs or bow springs. The torsion damper 3 has a hub flange 14. The hub flange 14 and the driver disc 11 can be rotated relative to one another over a limited angular range. The hub flange 14 is connected to the driver disc 11 (and the counter disc 12) via the spring element 5 in a torque-transmitting and vibration-damping manner. The torque is thus transmitted to the hub flange 14 by the driver disc 11 rotating relative to the hub flange 14 against the spring force of the spring element 5. The maximum rotation is limited by the maximum compression of the spring element 5 or by a stop. The hub flange 14 extends radially inward from the spring element 5. The torque is dissipated from the torsion damper 3 via the hub flange 14. The hub flange 14 of the torsion damper 3 is connected in a torque-transmitting manner on its radial inner side to the intermediate hub 6.

The intermediate hub 6 has a main body 15 extending substantially in the axial direction and a disc section 16 extending substantially radially outward from the main body 15. In the first embodiment, the main body 15 and the disc section 16 are integrally formed. The torque is introduced from the hub flange 14 into the main body 15. The main body 15 extends from the torsion damper 3 in the axial direction toward the drive shaft 7 (or an engine side). From an axial end of the main body 15, the disc section 16 extends radially outward. The torque is transmitted from the disc section 16 to the output component 4.

The output component 4 is formed by a torque limiter 17. The torque limiter 17 has a sliding plate 18 via which the torque is introduced from the intermediate hub 6. The sliding plate 18 is connected to the intermediate hub 6 by a rivet connection 19. The sliding plate 18 can be riveted to the intermediate hub 6 on the left or right side. The torque limiter 17 has friction linings 20. The sliding plate 18 is clamped between the friction linings 20 in the axial direction. The friction linings 20 are arranged radially further to the outside than the spring element 5 of the torsion damper 3. A disc spring 21 of the torque limiter 17 applies a defined clamping force in the axial direction to the friction linings 20. The friction linings 20, the sliding plate 18 and the disc spring 21 are fixed in the axial direction between a first side plate 22 and a second side plate 23 of the torque limiter 17. The disc spring 21 is arranged in the axial direction between the first side plate 22 and a support plate 24. The friction linings 20 and the sliding plate 18 are arranged in the axial direction between the support plate 24 and the second side plate 23. Between the first side plate 22 and the second side plate 23, a plurality of spacer rivets 25 are arranged distributed over the circumference and connect the side plates 22, 23 to one another. The support plate 24 has an external toothing which engages between the spacer rivets 25. As a result, the support plate 24 is axially displaceable relative to the side plates 22, 23 but radially and circumferentially/ tangentially fixed. The torque is transmitted from the second side plate 23 to an output hub 26. The second side plate 23 is connected to the output hub 26 by a rivet connection 27. The output hub 26 is in turn connected in a torque-transmitting manner to an output shaft 28.

The intermediate hub 6 is rotatably mounted on the output hub 26. A centering sleeve 29 is arranged between the intermediate hub 6 and the output hub 26, which bears the intermediate hub 6 in a centered manner. The centering sleeve may be made of plastic, for example. A securing ring 30 is provided to axially fix the torque limiter 17 to the torsion damper 3. The torsion damper 3 has a friction sleeve 31 which is firmly inserted, i.e., via a torsionally rigid connection, in the driver disc 11. The friction sleeve 31 has some play in relation to the securing ring 30 and the output hub 26. The friction sleeve 31 is mainly used for centering. The torsion damper 3 also has a friction device formed by a first friction ring 32, a second friction ring 33 and a disc spring 34. The first friction ring 32 is clamped between the counter disc 12 and the hub flange 14 in the axial direction by the force of the disc spring 34. The second friction ring 33 is clamped in the axial direction between the hub flange 14 and the driver disc 11.

Figure 2:
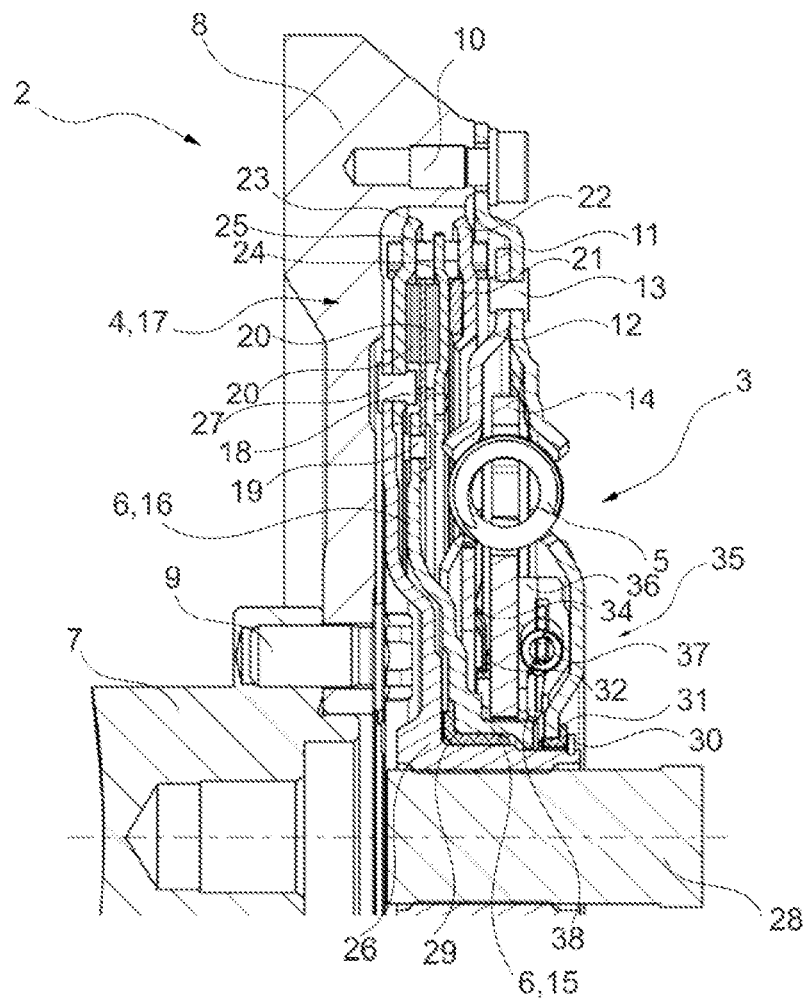
FIG. 2 shows a longitudinal sectional view of the drive train unit according to a second embodiment.

FIG. 2 shows a second embodiment of the drive train unit 1 according to the present disclosure. The second embodiment essentially corresponds to the first embodiment and has an internal intermediate hub 6 according to the disclosure, which connects the torsion damper 3 to the torque limiter 17. The second embodiment differs from the first embodiment in that a pre-damper 35 is provided instead of the second friction ring 33. The pre-damper 35 is arranged in the axial direction between the hub flange 14 and the driver disc 11. The pre-damper 35 has a pre-damper cage 36, a pre-damper spring element 37 and a pre-damper hub flange 38. The pre-damper cage 36 is provided in a two-part configuration. Torque is transmitted from the hub flange 14 or driver disc 11 to the pre-damper cage 36, which passes it on to the pre-damper hub flange 38 via the pre-damper spring element 37. The pre-damper hub flange 38 is connected in a torque-transmitting manner to the intermediate hub 6.

Figure 3:
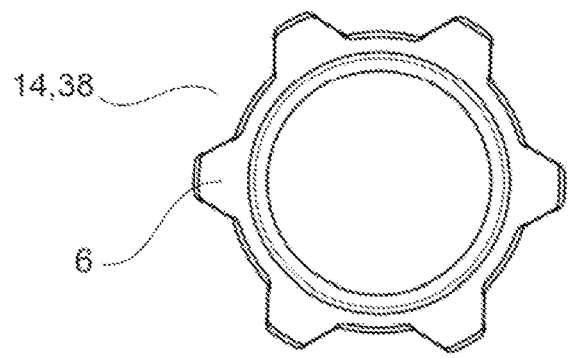
FIG. 3 shows a side view of a profiled gearing without a clearance angle between a hub flange and an intermediate hub of the drive train unit.
Figure 4:
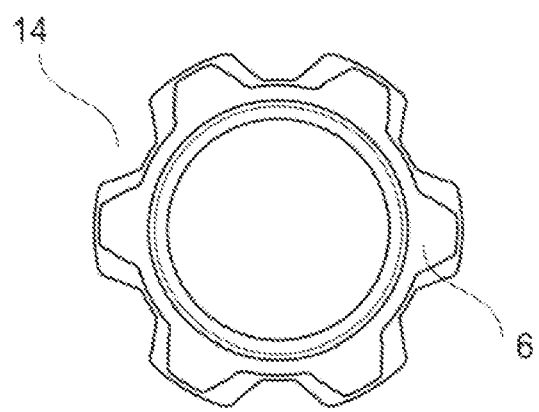
FIG. 4 shows a side view of a profiled gearing with a clearance angle between the hub flange and the intermediate hub of the drive train unit.

FIGS. 3 and 4 show a torque transmission between the torsion damper 3 and the intermediate hub 6. FIG. 3 shows a torque transmission via a profiled gearing without a clearance angle. FIG. 4 shows a torque transmission via a profiled gearing with a clearance angle.

If the torsion damper 3 does not have a pre-damper 35 (cf. first embodiment), a profiled gearing without a clearance angle is provided between the toothing of the hub flange 14 and the toothing of the intermediate hub 6. Alternatively, the hub flange 14 can be connected to the intermediate hub 6 via a torsionally rigid connection. For example, a material connection, such as a welded connection, and/or a force-fit and form-fit connection, such as a caulking connection, can be provided between the hub flange 14 and the intermediate hub, even if this is not shown.

If the torsion damper 3 has the pre-damper 35 (cf. second embodiment), a profiled gearing without a clearance angle is provided between the toothing of the pre-damper hub flange 38 and the toothing of the intermediate hub 6 and a profiled gearing with a clearance angle is provided between the toothing of the hub flange 14 and the toothing of the intermediate hub 6. The clearance angle thus corresponds to a torsion angle of the pre-damper 35. The toothing of the pre-damper hub flange 38 is in contact with the intermediate hub 6, since the pre-damper hub flange 38 is formed by a profiled gearing without a clearance angle. The pre-damper cage 36 is connected to the hub flange 14 in a torsionally rigid/rotationally fixed manner, for example suspended therein. As a result, the pre-damper hub flange 38 first acts on the intermediate hub 6 during a rotational movement and only when the clearance angle between the hub flange 14 and the intermediate hub 14 has been overcome is the pre-damper 35 bypassed and the hub flange 14 also comes into toothing engagement with the intermediate hub 6.

Figure 5:
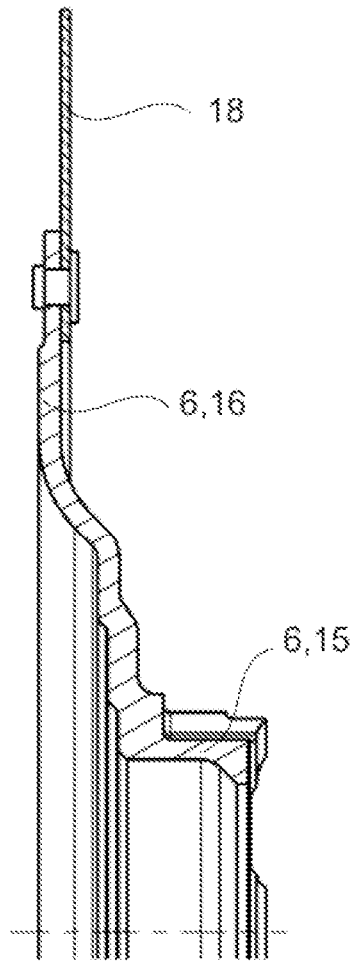
FIG. 5 shows a longitudinal sectional view of the intermediate hub configured as a single part.
Figure 6:
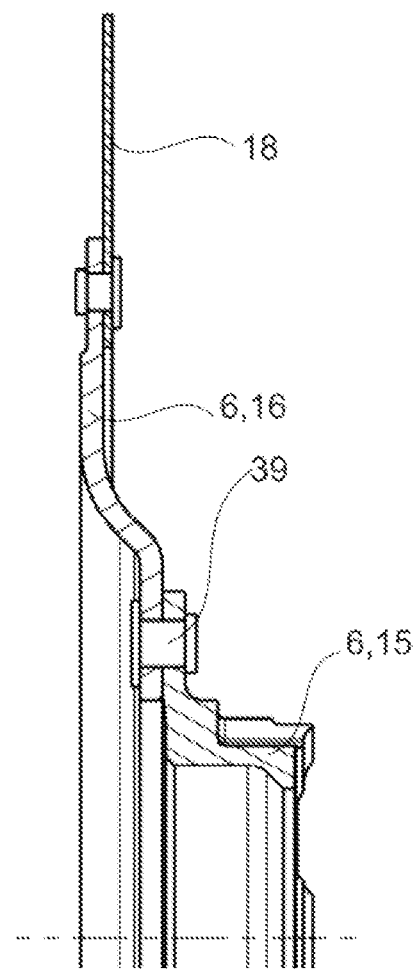
FIG. 6 shows a longitudinal sectional view of the intermediate hub in a two-part configuration.

FIGS. 5 and 6 show different embodiments of the intermediate hub 6. In FIG. 5, the main body 15 and the disc section 16 are configured integrally as a single-part intermediate hub 6. In FIG. 6, the main body 15 and the disc section 16 are configured as separate components as a two-part intermediate hub 6. In the embodiment shown, the main body 15 and the disc section 16 are connected to one another by a form-fit connection, in this case a rivet connection 39. Alternatively, the main body 15 and the disc section 16 may also be connected to one another via a material connection, such as a welded connection, and/or via a force-fit and form-fit connection, such as a caulking connection, although this is not shown. The intermediate hub 6 can be partially machined, in particular an outer contour of the intermediate hub 6, or machined as a whole, for example turned. The intermediate hub 6 may be surface-hardened, for example case-hardened. For example, the surface hardness of the intermediate hub may be greater than 680 HV.

Figure 7:
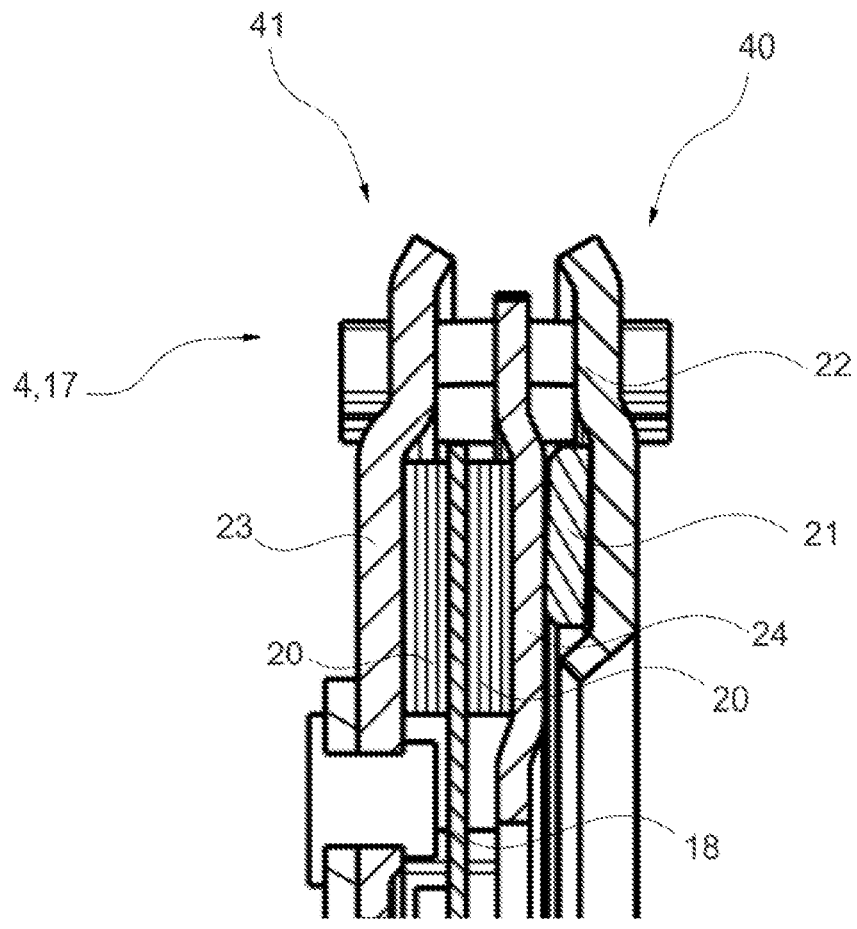
FIG. 7 shows an enlarged view of a section of FIG. 1 or FIG. 2 showing stiffening of side plates of a torque limiter of the drive train unit.

FIG. 7 shows an enlarged view of the torque limiter 17. The side plates 22, 23 are reinforced at their radial outer end to counteract expansion. In the embodiment shown, the torque limiter 17 has a first lateral cup 40 and a second lateral cup 41. The cups 40, 41 can go axially inwards (cf. FIG. 7) as well as outwards. Only the first cup 40 or only the second cup 41 can also be provided.

REFERENCE NUMERALS

1 Drive train unit
2 Input component
3 Torsion damper
4 Output component
5 Spring element
6 Intermediate hub
7 Drive shaft
8 Flywheel
9 Screw connection
10 Screw connection
11 Driver disc
12 Counter disc
13 Rivet connection
14 Hub flange
15 Main body
16 Disc section
17 Torque limiter
18 Sliding plate
19 Rivet connection
20 Friction lining
21 Disc spring
22 First side plate
23 Second side plate
24 Support plate
25 Spacer rivet
26 Output hub
27 Rivet connection
28 Output shaft
29 Centering sleeve
30 Securing ring
31 Friction sleeve
32 First friction ring
33 Second friction ring
34 Disc spring
35 Pre-damper
36 Pre-damper cage
37 Pre-damper spring element
38 Pre-damper hub flange
39 Rivet connection
40 First cup
41 Second cup

The invention claimed is:

1. A drive train unit for a drive train of a motor vehicle, comprising:
   an input component for introducing a torque;
   a torsion damper for damping rotational non-uniformities:
      connected in a torque-transmitting manner to the input component; and
      comprising:
         a main damper comprising a spring element; and
         a radial inner side;
   an output component for outputting the torque:
      connected in a torque-transmitting manner to the torsion damper; and
      arranged radially outside of the spring element;
   an intermediate hub connecting the torsion damper to the output component on the radial inner side of the torsion damper; and
   a pre-damper comprising:
      a pre-damper cage;
      a pre-damper spring element; and
      a pre-damper hub flange:
         rotationally coupled to the pre-damper cage via the pre-damper spring element; and
         connected in a torque-transmitting manner to the intermediate hub via a profiled gearing.

2. The drive train unit of claim 1 wherein the output component is configured as a torque limiter.

3. The drive train unit of claim 1, wherein the intermediate hub comprises:
   a main body extending substantially in an axial direction; and
   a disc section extending outward from the main body substantially in a radial direction.

4. The drive train unit of claim 3, wherein the main body and the disc section are configured as a single part.

5. The drive train unit of claim 3, wherein the main body and the disc section are configured as separate components.

6. The drive train unit of claim 1, wherein:
   the main damper further comprises:
      a driver disc; and
      a hub flange connected in a torque-transmitting manner to the intermediate hub via a profiled gearing.

7. The drive train unit of claim 1 further comprising an output hub connected in a torque transmitting manner to the output component, wherein the intermediate hub is mounted to be centered on the output hub.

8. The drive train unit of claim 7 further comprising a centering sleeve, wherein:
   the intermediate hub is mounted on the output hub via the centering sleeve; and
   the centering sleeve is made of plastic.

* * * * *